(12) United States Patent
Pirrotta

(10) Patent No.: US 12,434,444 B2
(45) Date of Patent: Oct. 7, 2025

(54) METHOD FOR ASSESSING A SEALING OF A CARTON PACKAGE AND AN APPARATUS THEREOF

(71) Applicant: Tetra Laval Holdings & Finance S.A., Pully (CH)

(72) Inventor: Onofrio Pirrotta, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/863,465

(22) PCT Filed: Jun. 19, 2023

(86) PCT No.: PCT/EP2023/066427
§ 371 (c)(1),
(2) Date: Nov. 6, 2024

(87) PCT Pub. No.: WO2024/008425
PCT Pub. Date: Jan. 11, 2024

(65) Prior Publication Data
US 2025/0256467 A1      Aug. 14, 2025

(30) Foreign Application Priority Data
Jul. 4, 2022   (EP) ..................... 22182754

(51) Int. Cl.
*B29C 65/08*   (2006.01)
*B29C 65/00*   (2006.01)
*B29C 65/82*   (2006.01)

(52) U.S. Cl.
CPC .......... *B29C 65/8253* (2013.01); *B29C 65/08* (2013.01); *B29C 66/4312* (2013.01); *B29C 66/849* (2013.01)

(58) Field of Classification Search
CPC . B29C 65/8253; B29C 65/08; B29C 66/4312; B29C 66/849
(Continued)

(56) References Cited

U.S. PATENT DOCUMENTS 10,683,118 B2 * 6/2020 Yuhara .................... B29C 65/08
2008/0173385 A1   7/2008 Ansinn

FOREIGN PATENT DOCUMENTS

| CN | 101518949 A | 9/2009 |
| CN | 104347822 A | 2/2015 |

(Continued)

OTHER PUBLICATIONS

Written Opinion of the International Searching Authority mailed Sep. 13, 2023, for International Application No. PCT/EP2023/066427.

(Continued)

*Primary Examiner* — James D Sells
(74) *Attorney, Agent, or Firm* — Renner, Otto, Boisselle & Sklar, LLP

(57) ABSTRACT

A method for assessing a sealing of a carton package arranged to hold a food product is disclosed. The sealing is produced by using ultrasonic sealing technology. The method comprises capturing an image data set depicting the sealing, wherein the image data set comprises a first data sub-set associated with a first color channel and a second data sub-set associated with a second color channel, identifying an adherence section by using the first data sub-set, and identifying a non-adherence section by using the second data sub-set.

15 Claims, 4 Drawing Sheets

(58) Field of Classification Search
USPC .......................................................... 156/64
See application file for complete search history.

(56) References Cited

FOREIGN PATENT DOCUMENTS

| | | |
|---|---|---|
| CN | 104512579 A | 4/2015 |
| CN | 105241375 A | 1/2016 |
| CN | 105588694 A | 5/2016 |
| CN | 110620059 A | 12/2019 |
| CN | 112888555 A | 6/2021 |
| CN | 113165276 A | 7/2021 |
| CN | 113677971 A | 11/2021 |
| EP | 3647022 A1 | 5/2020 |
| EP | 3647024 A1 | 5/2020 |
| EP | 3991950 A1 | 5/2022 |
| WO | 2021089125 A1 | 5/2021 |

OTHER PUBLICATIONS

International Search report mailed Sep. 13, 2023, for International Application No. PCT/EP2023/066427.

* cited by examiner

METHOD FOR ASSESSING A SEALING OF A CARTON PACKAGE AND AN APPARATUS THEREOF

TECHNICAL FIELD

The invention relates to food packaging technology. More particularly, it is related to assessing a carton package sealing made by using ultrasonic sealing technology.

BACKGROUND ART

Today, it is well known to use heat induction sealing for forming sealings, sometimes referred to as welds, in carton packages. In roll-fed carton filling machines, it is common practice to form a web of packaging material into a tube by sealing together opposing ends of the web. Often this step is referred to as longitudinal sealing. Once having the tube formed, a food product, such as milk, is fed into the tube from above. In a lower end of the tube, transversal sealings are made. By making two transversal sealings at the same time and cutting between the two sealings, pouches filled with the food product are formed from the lower end of the tube. In subsequent steps, these pouches can be formed into e.g. brick-shaped packages by folding the pouches.

Since induction heat sealing requires a layer in the packaging material that generates heat in response to a magnetic field generated by inductors of a transversal heat sealing device, other sealing technologies have been developed to also be able to provide reliable and efficient sealing for packaging materials without e.g. an Aluminum layer. One such technology is ultrasonic sealing. Instead of generating heat by inducing eddy currents in the packaging material, which in turn results in that outer and inner plastic layers of the packaging material melt, ultrasonic sealing devices generate heat by using ultrasonic waves that interact with the plastic material such that heat is generated.

To protect the food product held inside the package, both the longitudinal sealing and the two transversal sealings, one in an upper end and one in a lower end of the package, should be made such that the food product is not released from the package, but also such that bacteria, germs or other microorganisms are hindered from entering into the package. To be able to provide cost efficient packages, thousands of packages are produced per hour. Due to the high speed, less margins are available for making reliable sealings. Put differently, to be able to generate sufficient heat in a transversal sealing area of the package and still meet the time limits required to provide the high speed, the combination of packaging material and the settings of the transversal sealing device should be appropriately set. In addition, to make sure that the packages produced are provided with reliable transversal sealings, samples for quality assessment are taken at regular intervals.

The quality assessment can be made in different ways. It is today common practice today to use a microscope to assess the sealings manually. By using the microscope in combination with a quality checklist, it is made possible to detect deviations in the packages that may be the result of incorrect settings of the transversal sealing device or that the packaging material is not fulfilling set requirements. Once having identified a quality issue, the transversal sealing device and the packaging material can be analyzed in further detail.

The quality assessment of today, with very few exceptions, identifies packages with sealings that are at risk of not being able to protect the food product from the surrounding environment and also that are at risk to start leaking. However, as the speed of filling machines is increased, less time is available for transversally seal the packages, which in turn increases the risk for insufficient sealings. In addition, increased cost efficiency requirements, resulting in e.g. thinner layers in the packaging material, may also increase the risk for insufficient sealings. Further, increased environmental requirements, e.g. making some material, such as Aluminum foil, less preferred to use, also may have the effect that the risk of insufficient sealings is increased. As a result, even though the sealing devices of the filling machines are reliable, the increased demands have the effect that these reliable sealing devices are preferably combined with reliable sealing quality assessment to make sure that when situations occur that results in insufficient sealing, this is identified. Once identified, actions can be taken with the positive effect that the risk of shipping insufficient packages is reduced and also that the product waste can be held low.

SUMMARY

It is an object of the invention to at least partly overcome one or more of the above-identified limitations of the prior art. In particular, it is an object to provide a method for assessing a sealing of a carton package in a reliable and cost-efficient manner.

According to a first aspect, it is provided a method for assessing a sealing of a carton package arranged to hold a food product, wherein the sealing is produced by using ultrasonic sealing technology, said method comprising capturing an image data set depicting the sealing, wherein the image data set comprises a first data sub-set associated with a first color channel and a second data sub-set associated with a second color channel, identifying an adherence section by using the first data sub-set, and identifying a non-adherence section by using the second data sub-set.

An advantage with using different sub-sets for identifying the adherence section, that is, a section in which a first and a second side of the packaging material is attached to one another, e.g. as an effect of that plastic layers of the two sides have been melted and merged together, is that both the adherence section and the non-adherence section are positively identified. Put differently, the non-adherence section is not deemed to be any section not being the adherence section. By using this approach and actively determine both the adherence and the non-adherence section, a more reliable sealing quality assessment can be achieved.

A further advantage is speed. In contrast to the common approach used for quality assessment of induction heat sealings in which a print formed from a ridge of the inductor coil is identified, the approach herein suggested is making use of the fact that such print does not need to be identified when assessing ultrasonic sealings.

Since heat generation achieved by using the ultrasonic sealing technology is different from the heat generation achieved by using induction heat sealing technology in that less contact between sealing device and the packaging material is provided, the packaging material is less mechanically affected by the ultrasonic sealing technology. As an effect of this, it is possible to make reliable sealing assessment by analyzing the first and second sub-sets, linked to different color channels, since these color channels may in turn be linked to how the light is affected when passing the adherence section and the non-adherence section, respectively.

The method may further comprise identifying a sealing section by using the first and second data sub-set, wherein the sealing section corresponds to a top fin, a bottom fin or a longitudinal sealing section of the carton package, wherein both the adherence section and the non-adherence section are comprised within the sealing section.

An advantage by having both identified the adherence section and the non-adherence section by using different sub-sets of the image data set is that the two can be combined at a later stage to provide a reliable identification of the sealing section. The adherence section may be a section in which the two sides of the packaging material are merged together. The non-adherence section may on the other hand be a section in which the two sides of the packaging material abut each other, but are not merged together. The non-adherence section can be used for extracting characteristic lines, e.g. product line and cut line, by using an average of lines formed from edges of the adherence section and the non-adherence section. In this way, a more robust line fitting is achieved.

The image data set may be captured by using a camera placed on a first side of the sealing of the package, said method further comprising illuminating the sealing by using a light source provided on a second side of the sealing, wherein the second side of the sealing is opposite to the first side of the sealing, thereby providing for that light emitted from the light source is passed through the sealing of the package into the camera.

The light provided can be natural light, diffused light or polarized light. Since different type of light may be linked to different benefits, the image data set can comprise a series of image data sets captured with natural light, diffracted light and polarized light. For all light options, the first and second data sub-sets may be captured.

The light source may be one or several light emitting diodes (LEDs) emitting light with at least one specific frequency, wherein a first frequency range of the first color channel and/or a second frequency range of the second color channel are set based on the at least one specific frequency of the one or several LEDs.

An advantage of using LEDs is that these can be made in a cost efficient manner and also they can be made to produce light with a specific frequency.

The first frequency range of the first color channel and/or the second frequency range of the second color channel are set based on properties of the packaging material.

By having the light source adapted to meet specific details of the packaging material, more reliable quality assessment of the sealing can be achieved.

The image data set may be captured in multiple versions, wherein the multiple versions have different light settings, wherein the light settings comprise specific frequency or frequencies of the light emitted from the light source and/or amplitude(s) of the light emitted from the light source.

As presented above, in addition to multiple versions, it is also possible to use different types of light.

The packaging material may comprise a non-metallic light barrier layer, wherein the nonmetallic light barrier layer is a cellulose-based light barrier layer, and the cellulose-based light barrier layer is adapted to block light with frequencies giving rise to microbacterial growth and/or vitamin losses in the food product held in the carton package.

An advantage of using a non-metallic light barrier layer is that the environmental impact of the packaging material can be reduced.

The method may further comprise providing a reference object next to the sealing of the carton package, wherein the reference object has a reference length and/or a reference width, identifying the reference object depicted in the image data, determining absolute lengths and/or absolute widths of the adherence section and/or the non-adherence section by using the reference length and/or the reference width.

The method may further comprise applying a substance, such as an ink, onto the sealing prior to capturing the image data set.

By applying the substance to the sealing, the light is instead of passing the adherence section and the non-adherence section, passing the adherence section with the applied substance and the non-adherence section with the applied substance. The advantage of this is that the substance will also have an effect on the light passing and in different ways for the different sub-sets. Thus, by combining a wise selection of the substance and the frequency of the light in view of the properties of the packaging material, it is made possible to make reliable quality assessment of the sealing.

The image data set may further comprise a third data sub-set associated with a third color channel, said method may further comprise identifying a substance affected section by using the third data sub-set, wherein the step of identifying the sealing section is performed by using the first, the second and the third data sub-set.

By using a third data sub-set and having the substance chosen in view the third color channel linked to this data sub-set, it is made possible to more easily find the substance affected section. This substance affected section may be the adherence section.

The sealing section may comprise an overlap sub-section in which a transversal sealing and a longitudinal sealing overlap.

A challenge with the carton packages having the longitudinal sealing and the transversal sealings is that there is a section of the package in which these coincide. Having three layers of packaging material comes with a challenge and the risk for an insufficient sealing cannot be neglected. Thus, having a reliable sealing quality assessment is particular relevant for packages having such overlap sub-section.

The method may further comprise, prior to the step of capturing the image data set, removing the food product held in the package, unfolding the package such that the sealing is exposed, and dissolving the package such that a carton layer of the packaging material is removed.

An advantage with removing the carton layer is that the remaining layer can be transparent, thereby allowing the light to pass through the sealing.

According to a second aspect it is provided an apparatus for assessing a sealing of a carton package arranged to hold a food product, wherein the sealing is produced by using ultrasonic sealing technology, said apparatus comprising a camera configured to capture an image data set depicting the sealing, wherein the image data set comprises a first data sub-set associated with a first color channel and a second data sub-set associated with a second color channel, and a control unit, comprising a processor and a memory, configured to identify an adherence section in the image data set by using the first data sub-set, and to identify a non-adherence section in the image data set by using the second data sub-set.

The same advantages as presented above with respect to the first aspect also apply to this second aspect.

The apparatus may further comprise a light source arranged to illuminate the sealing, wherein the camera may be placed on a first side of the sealing of the package and the light source is provided on a second side of the sealing, wherein the second side of the sealing is opposite to the first side of the sealing, thereby providing for that light emitted from the light source is passed through the sealing of the package into the camera.

The light source may be one or several light emitting diodes (LEDs) emitting light with at least one specific frequency, wherein a first frequency range of the first color channel and/or a second frequency range of the second color channel are set based on the at least one specific frequency of the one or several LEDs.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 generally illustrates a roll-fed filling machine.

DETAILED DESCRIPTION

Figure 1:
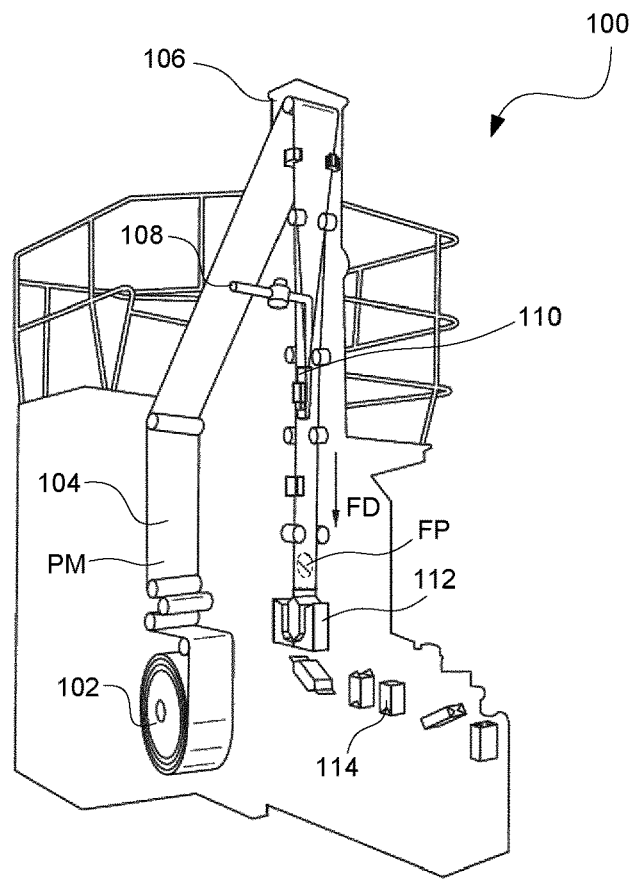

With reference to FIG. 1, a filling machine 100, also referred to as packaging machine, is schematically illustrated. As illustrated, a reel 102 of packaging material PM can be provided. Often the packaging material PM comprises a number of layers, such as a carton layer for providing robustness and environmental benefits, an inner plastic layer for avoiding direct contact between the carton layer and a food product FP, and an outer plastic layer for protecting the carton layer from the surrounding environment. When producing packages, the packaging material PM is provided by unwinding the reel 102 such that a web 104 is provided. The web 104 may be sterilized or in any other treated such that microorganisms are removed. In the example illustrated in FIG. 1, a sterilization device 106 is provided in a top of the filling machine 100. The sterilization device 106 may be an LVEB device, configured to kill of microorganisms by using Low-Voltage Electron Beams. Another possibility is to use a hydrogen peroxide bath to kill off the microorganisms.

After the web 106 is treated such that the microorganisms are removed, the web 104 can be formed into a tube. Once formed into the tube, the food product FP can be filled into the tube from above via a filling pipe 108. To provide for that the tube is sealed together longitudinally, a longitudinal sealing device 110 can be provided.

After being longitudinally sealed, the tube is fed in a feeding direction FD to a transversal sealing device 112 in which transversal sealings are made. Often two transversal sealings are made at the same time such that an upper sealing of one package and a lower sealing of another package is formed at the same time. Once these two sealings have been made, a cut is provided between the two sealings such that the lowermost package can be released from the tube. After having provided the transversal sealings, the packages 114 are folded and formed into their final shape, such as a brick-shaped form.

Even though a roll-fed filling machine is illustrated, other types of filling machines are also available. For instance, another option is a so-called blanks fed filling machine. In this type of machine, blanks, i.e. flat-folded sleeves of packaging material, are provided and formed into packages filled with food product.

Figure 2:
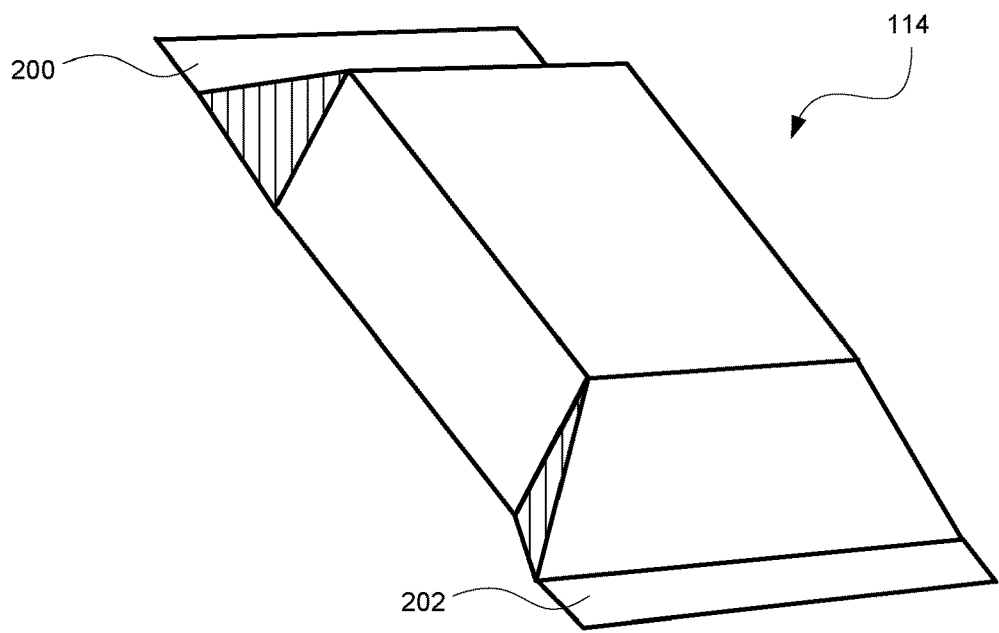
FIG. 2 illustrates a package in further detail.

FIG. 2 illustrates the package 114 in further detail. As illustrated, after being fed from the transversal sealing device 112, the package 114 may be provided with a first sealing 200 in one end of the package and a second sealing 202 in another end. IN subsequent steps, in so-called folding devices, not illustrated in FIG. 1, the package 114 can be folded into its final shape. For instance, a flat top and a flat bottom may be formed, and the transversal sealings can be folded down such that these abut the flat top and the flat bottom, respectively. The packaging material PM may be provided with weakening lines for facilitating the folding.

Figure 3:
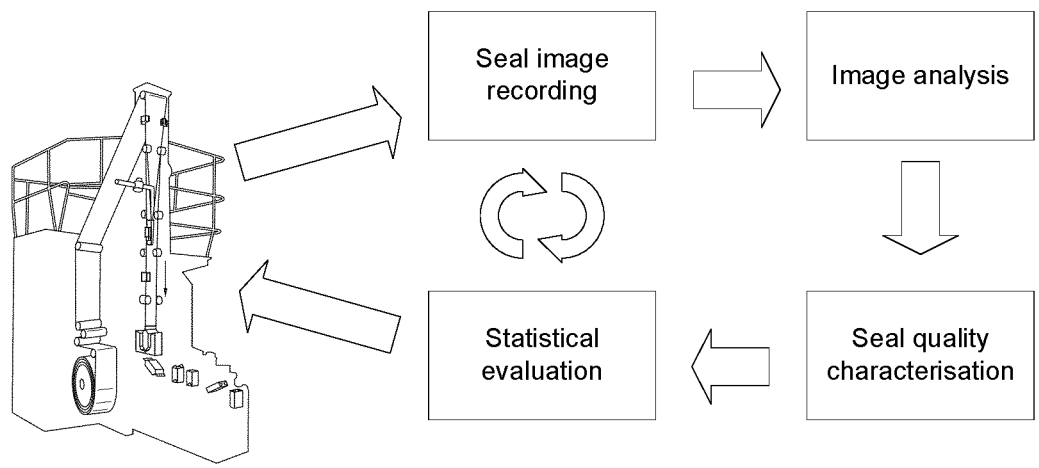
FIG. 3 illustrates a general concept for seal quality assessment.

To assure that the transversal sealings meet set quality requirements, image data sets depicting the transversal sealings can be captured and analyzed. One approach for such analysis is illustrated in FIG. 3. As illustrated, in a first step, seal image data may be recorded, i.e. the image data sets can be captured. This step can be performed in various ways. One of these ways is to take samples among the produced packages and to analyze these in detail. The number of samples may vary from filling machine to filling machine, and a sampling frequency may depend on e.g. the packaging material PM being used. For carton packages, comprising a number of layers, wherein one of these layer is made of carton, it has proven beneficial to dissolve the packages such that the carton layer is removed. Once having the carton layer removed, the plastic layers that are adhered to each other and thereby form the transversal sealing can more easily be analyzed. In addition, since the plastic layers are often transparent, dissolving the packages such that the carton layer can be removed also comes with the advantage that light can be emitted through the remaining layers of the packaging material PM.

In an image analysis step, the image data sets captured in the seal image recording step can be analyzed such that different deviations can be spotted. In case, for instance, it has been found that a width of a transversal sealing is below a pre-set threshold, a notification can be transmitted to an operator.

In addition to identifying the deviations, which may indicate quality issues, features extracted in the image analysis step may be fed to a seal quality characterization step. In this step, the different features extracted from the image analysis step can be further analyzed.

Data from the seal quality characterization step may be fed to a statistical evaluation step. In the statistical evaluation step, data from a plurality of packages can be used for finding e.g. deviations over time. As illustrated, the statistical evaluation step may be configured to interact directly with the seal image recording step. A benefit with this can be that the settings used can be adapted to pinpoint certain features of the sealings in which additional data is needed. For instance, from the statistical evaluation step, input about the frequency to be used for illuminate the samples may be provided. Having more image data sets captured using this frequency may result in that a more reliable statistical analysis can be made. The communication between the seal image recording step and the statistical evaluation step may follow a pre-programmed pattern or it may be based on machine learning/artificial intelligence approach (ML/AI) in which the communication between the two steps is allowed to develop over time. An output from the statistical evaluation step may be updated machine settings for the filling machine including the transversal sealing device.

The concept illustrated in FIG. 3 can be implemented in different ways. By way of example, FIG. 4 generally illustrates an apparatus 400 for assessing the transversal sealings 200, 202 of the packages 114 produced by the filling machine 100 illustrated in FIG. 1.

Figure 4:
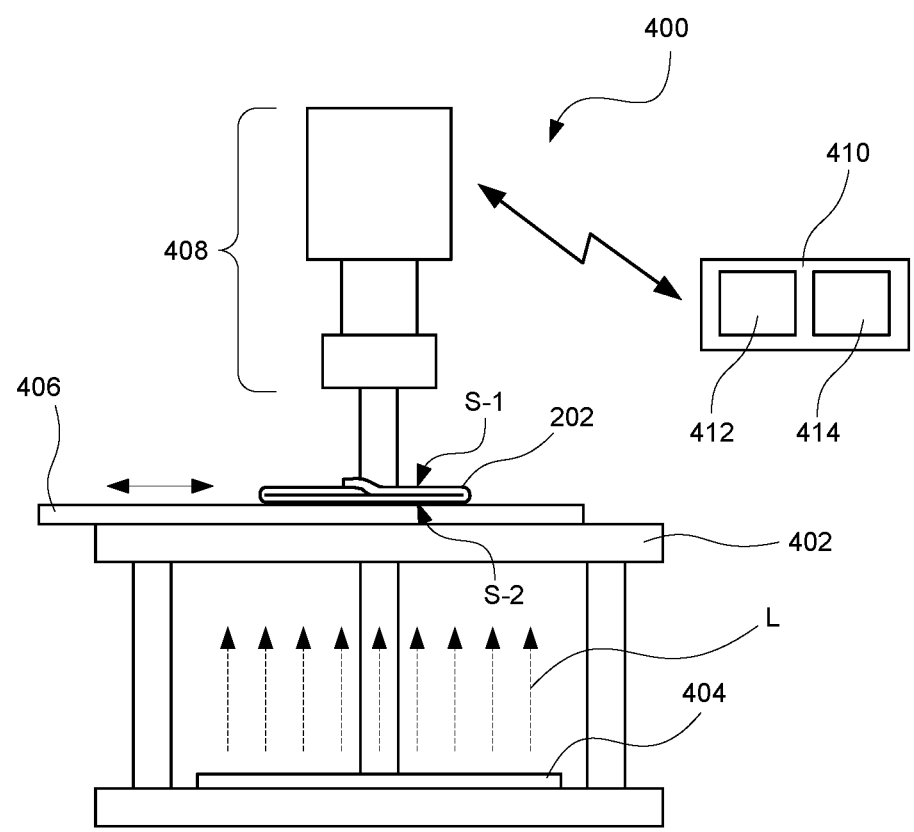
FIG. 4 illustrates generally an apparatus for assessing a sealing.

The package 114 may be placed on a table 402 such that an image data set depicting the sealing 200, 202 can be obtained. In FIG. 4, the second sealing 202 is being analyzed by way of example. The table 402 may be provided with an opening such that light L emitted from light sources 404, such as LEDs, can be allowed to fall onto the sealing 202,202 without being blocked by the table 402. The table 402 may comprise a movable member 406 such that the sealing 202, 202 can be moved with respect to the light sources 404 and a camera 408. As illustrated, the light sources 404 may be placed in a lower part of the table 402 such that the light L can fall onto the sealing 200, 202 from below, or put differently towards a second side S-2 of the sealing. The camera 408 may be placed above the sealing 200, 202, that is, facing a first side S-1 of the sealing, such that the light L emitted from the light sources 404 can pass the sealing 200, 202 and thereafter be captured by the camera 408 and transformed into the image data set.

The image data set may be transmitted from the camera 408 to a control unit 410. This may comprise a processor 412 and a memory 414 configured to process the image data set such that an adherence section in the image data set is identified by using a first data sub-set associated with a first color channel, and to identify a non-adherence section in the image data set by using a second data sub-set associated with a second color channel, as will be further elaborated upon below.

The communication between the camera 408 and the control unit 410 may be wireless, as illustrated. Even though not illustrated, to provide for such communication, the camera 408 may be provided with a data communication module and in the same way the control unit 410 may comprise such module. Alternatively, even though not illustrated, the camera 408 and the control unit 410 may be integral parts of one and the same unit. Still an option, also not illustrated, is that the control unit 410 is in communication with a backend server such that some of the data processing can be performed in the control unit 410, which may be placed on site, and some of the data processing can be made in the backend server, i.e. a remote data processing device. It is also possible to have the control unit 410 acting as a gateway transferring the image data set to the backend server such that all data processing is performed in the backend server.

Figure 5:
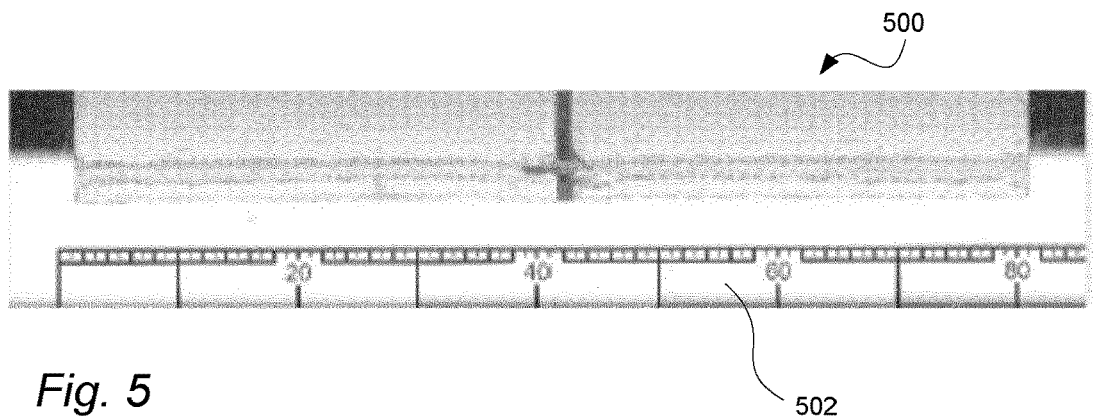
FIG. 5 illustrates an example of an image data set captured by the apparatus illustrated in FIG. 4.
Figure 6:
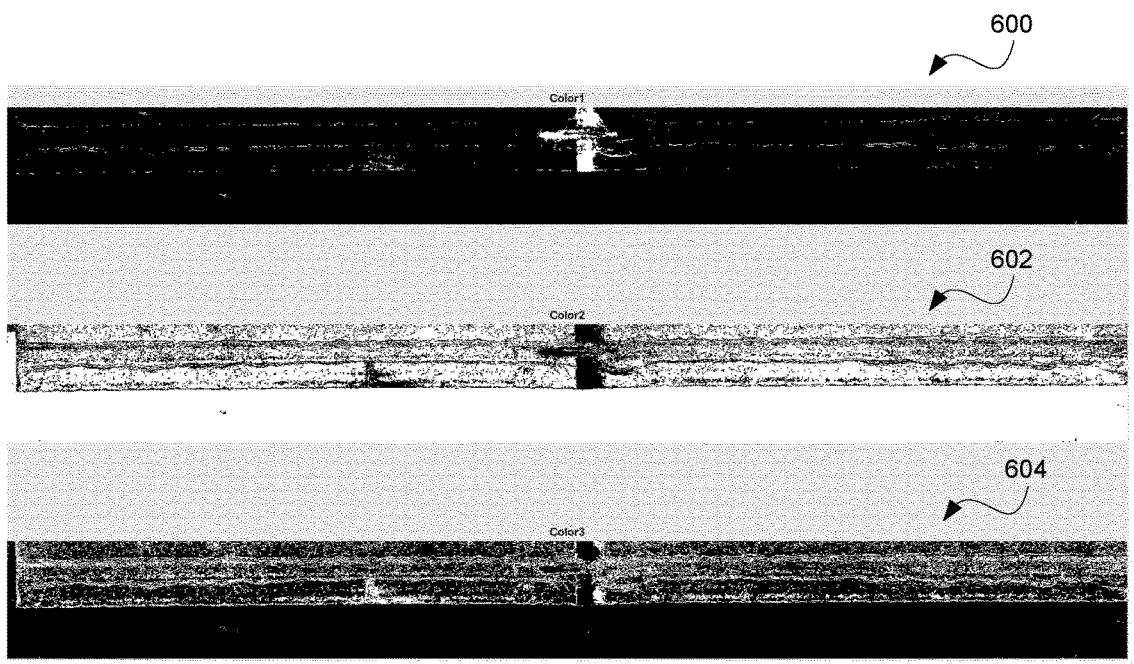
FIG. 6 illustrates a first, a second and a third sub-sets of the image data set illustrated in FIG. 5.
Figure 7:
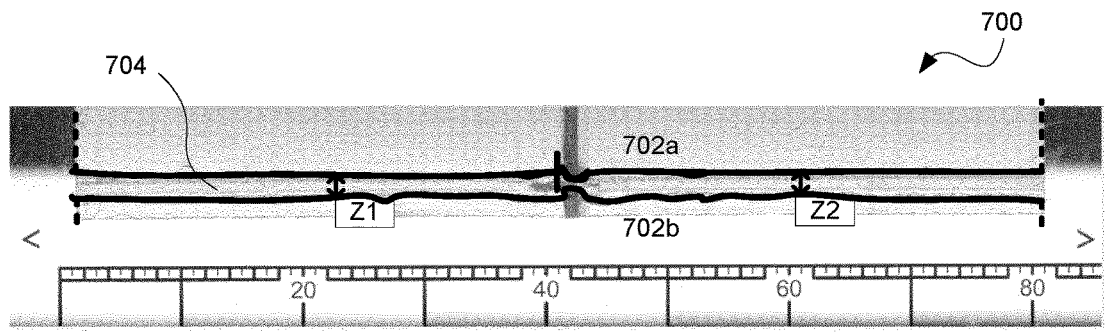
FIG. 7 illustrates the image data set illustrated in FIG. 5 with extracted features overlaid.

FIG. 5 illustrates an example of the image data set 500 depicting the sealing 202. As illustrated, to be able to transfer lengths identified in the image data set 500 into absolute measures, e.g. distances in mm, a reference object 502, such as a ruler, may be provided. The reference object 502 may form part of the movable member 406 illustrated in FIG. 4.

The image data set 500 illustrated in FIG. 5 may comprise a number of data sub-sets. For instance, as illustrated the image data set 500 may comprise a first, a second and a third sub-set 600, 602, 604. Each of these sub-sets may correspond to a color channel. For instance, the three sub-sets may correspond to the color channels red, green and blue. In other words, the image data set 500 may comprise sub-sets each being related to a specific light frequency range.

A benefit of analyzing the different sub-sets individually is that different features may be reflected in different ways in the different frequency ranges. Thus, as an effect, by analyzing the different sub-sets individually and thereafter combine them, it is made possible to identify features more reliable compared to analyzing the image data set 500 on its own.

The different frequency ranges of the first to third data sub-sets may be tuned with respect to a frequency range of the light L emitted from the light sources. By adapting the light L in this manner and also make use of the fact that the wavelength of the light is known when analyzing the first to third data sub-sets 600, 602, 604 features, such as adherence sections and non-adherence sections of the sealing, can be identified in a more reliable manner. The frequency of the light L emitted from the light sources may be set by changing settings of the light sources. Another option, even though not illustrated, is to place filters between the light sources and the sealing such that only light with one or a few specific frequencies are allowed to pass.

It has proven particularly advantageous to assess ultrasonic sealings by analyzing the sub-sets as discussed above. One reason for this is that a sealing pattern formed by an ultrasonic sealing device is different from the sealing pattern formed by an induction heat sealing device in that there in some cases is less contact between the ultrasonic sealing device and the packaging material than between the induction heat sealing device and the packaging material, i.e. less pressure provided on the packaging material from the ultrasonic sealing device.

Once having extracted features from the sub-sets 600, 602, 604, these can be overlaid on the image data set 500 such that an image data set with features 700 is formed. As illustrated, edges between adherence sections 702, 702b and a non-adherence section 704 may be emphasized by overlaid lines. In the example illustrated, the non-adherence section 704 is a section in which a cut can be provided for separating two packages from one another. To provide the operator with relevant information, the overlaid features are not restricted to emphasizing lines or areas of particular relevance, but may also include added information in the form of text or numbers. For instance, a first width of the non-adherence section may be marked and a measure may be associated with it, herein the text "Z1" is provided. In a similar manner, a second width of the non-adherence section may be marked and provided with the text "Z2".

Figure 8:
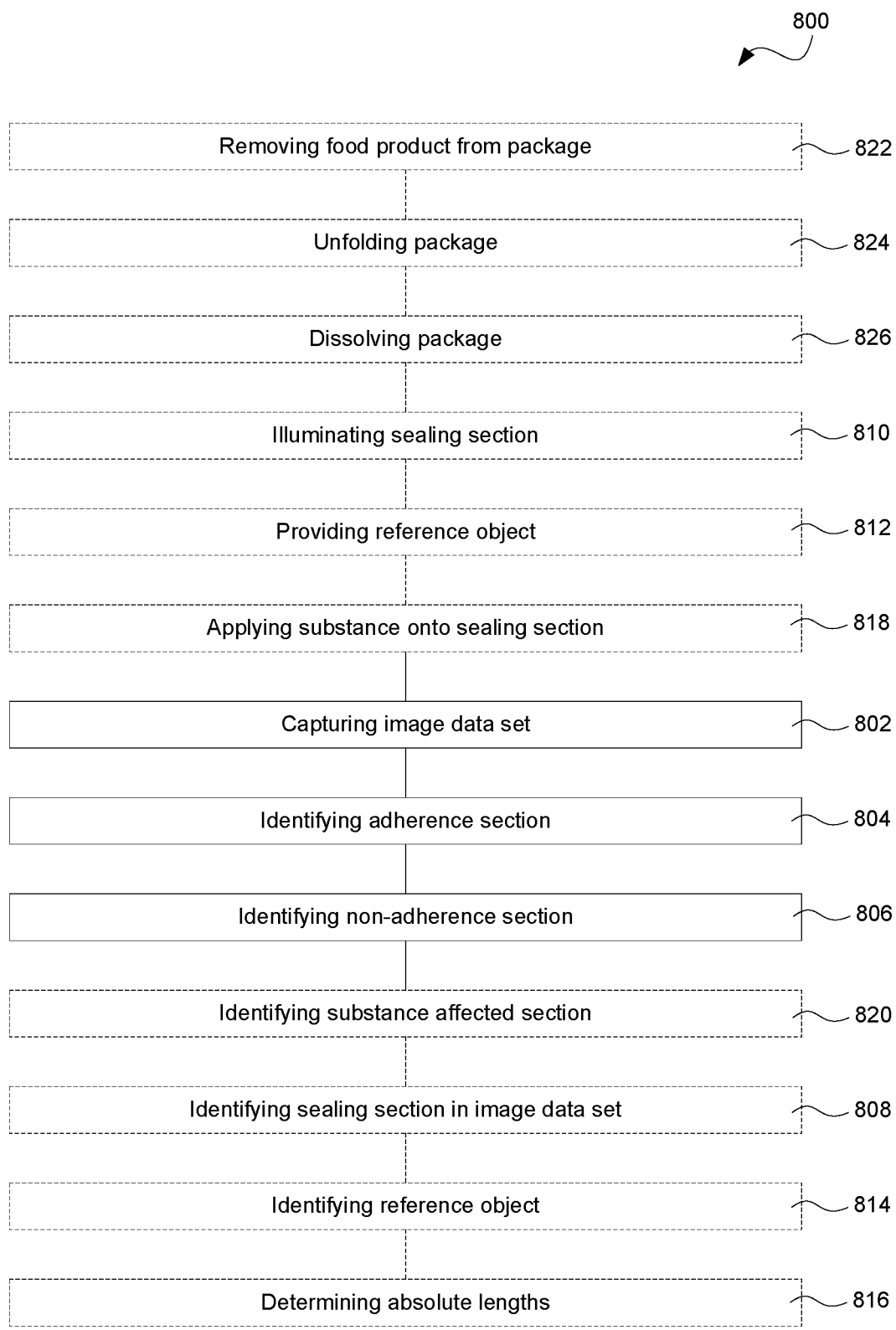
FIG. 8 is a flowchart illustrating a method for assessing a sealing.

FIG. 8 is a flowchart illustrating a method 800 for assessing the sealing 200,202. In first step 802, the image data set 500 can be captured. In second step 804, the adherence section 702a, 702b can be identified. In a third step 806, the non-adherence section 704 can be identified.

Optionally, in a fourth step 808, the sealing section, which may correspond to a top fin, a bottom fin, and/or a longitudinal sealing, may be identified by using the first and second sub-set.

Optionally, in a fifth step 810, the sealing section may be illuminated by using the light source 404 such that light L emitted from the light source can be passed through the sealing 200, 202 of the package 114 into the camera 408.

Optionally, in a sixth step 812, the reference object 502 can be provided next to the sealing 200, 202, wherein the reference object has a reference length and/or a reference width. In a seventh step 814, the reference object depicted in the image data can be identified. In an eighth step 816, absolute lengths and/or absolute widths of the adherence section 702a, 702b and/or the non-adherence section 704 can be determined by using the reference length and/or the reference width.

Optionally, in a ninth step 818, a substance, such as an ink, may be applied onto the sealing prior to capturing the image data set. By applying the substance, the light L emitted from the light source may be affected in different ways in the different color channels resulting in that for instance the adherence section and/or the non-adherence section faster and/or more reliable.

Optionally, in a tenth step 820, a substance affected section may be identified by using the third data sub-set 604. By having the substance affected section linked to one of the data sub-sets, which may be achieved by choosing a substance that is related to the third color channel related to the third data sub-set, the identification of the sealing section can be made more reliable.

Optionally, prior to the first step 802 of capturing the image data set, in an eleventh step 822, the food product held in the package can be removed, thereafter, in a twelfth step 824, the package can be unfolded such that the sealing is exposed, and, then, in a thirteenth step 826, the package can be dissolved such that a carton layer of the packaging material is removed.

Even though the different steps are referred to in a certain order, the steps may be performed not only in the order described above, but also in other orders. In addition, some of the steps may for time-efficiency reasons be performed in parallel.

From the description above follows that, although various embodiments of the invention have been described and shown, the invention is not restricted thereto, but may also be embodied in other ways within the scope of the subject-matter defined in the following claims.

The invention claimed is:

1. A method for assessing a sealing of a carton package arranged to hold a food product, wherein the sealing is produced by using ultrasonic sealing technology, said method comprising
   capturing an image data set depicting the sealing, wherein the image data set comprises a first data sub-set associated with a first color channel and a second data sub-set associated with a second color channel,
   identifying an adherence section by using the first data sub-set, and
   identifying a non-adherence section by using the second data sub-set.

2. The method according to claim 1, further comprising
   identifying a sealing section by using the first and second data sub-set, wherein the sealing section corresponds to a top fin, a bottom fin or a longitudinal sealing section of the carton package,
   wherein both the adherence section and the non-adherence section are comprised within the sealing section.

3. The method according to claim 1, wherein the image data set is captured by using a camera placed on a first side of the sealing of the package, said method further comprising
   illuminating the sealing by using a light source provided on a second side of the sealing, wherein the second side of the sealing is opposite to the first side of the sealing, thereby providing for that light emitted from the light source is passed through the sealing of the package into the camera.

4. The method according to claim 3, wherein the light source is one or several light emitting diodes emitting light with at least one specific frequency, wherein a first frequency range of the first color channel and/or a second frequency range of the second color channel are set based on the at least one specific frequency of the one or several LEDs.

5. The method according to claim 3, wherein the first frequency range of the first color channel and/or the second frequency range of the second color channel are set based on properties of the packaging material.

6. The method according to claim 3, wherein the image data set is captured in multiple versions, wherein the multiple versions have different light settings, wherein the light settings comprise specific frequency or frequencies of the light emitted from the light source and/or amplitude(s) of the light emitted from the light source.

7. The method according to claim 1, wherein a packaging material comprises a non-metallic light barrier layer, wherein the nonmetallic light barrier layer is a cellulose-based light barrier layer, and the cellulose-based light barrier layer is adapted to block light with frequencies giving rise to microbacterial growth and/or vitamin losses in the food product held in the carton package.

8. The method according to claim 1, further comprising
   providing a reference object next to the sealing of the carton package, wherein the reference object has a reference length and/or a reference width,
   identifying the reference object depicted in the image data,
   determining absolute lengths and/or absolute widths of the adherence section and/or the non-adherence section by using the reference length and/or the reference width.

9. The method according to claim 1, further comprising applying a substance, such as an ink, onto the sealing prior to capturing the image data set.

10. The method according to claim 9, wherein the image data set further comprises a third data sub-set associated with a third color channel, said method further comprising
    identifying a substance affected section by using the third data sub-set,
    wherein the step of identifying the sealing section is performed by using the first, the second and the third data sub-set.

11. The method according to claim 1, wherein the sealing section comprises an overlap sub-section in which a transversal sealing and a longitudinal sealing overlap.

12. The method according to claim 1, further comprising, prior to the step of capturing the image data set,
  removing the food product held in the package,
  unfolding the package such that the sealing is exposed, and
  dissolving the package such that a carton layer of the packaging material is removed.

13. An apparatus for assessing a sealing of a carton package arranged to hold a food product, wherein the sealing is produced by using ultrasonic sealing technology, said apparatus comprising
  a camera configured to capture an image data set depicting the sealing, wherein the image data set comprises a first data sub-set associated with a first color channel and a second data sub-set associated with a second color channel, and
  a control unit, comprising a processor and a memory, configured to identify an adherence section in the image data set by using the first data sub-set, and to identify a non-adherence section in the image data set by using the second data sub-set.

14. The apparatus according to claim 13, said apparatus further comprising
  a light source arranged to illuminate the sealing,
  wherein the camera is placed on a first side of the sealing of the package and the light source is provided on a second side of the sealing, wherein the second side of the sealing is opposite to the first side of the sealing,
  thereby providing for that light emitted from the light source is passed through the sealing of the package into the camera.

15. The apparatus according to claim 14, wherein the light source is one or several light emitting diodes emitting light with at least one specific frequency, wherein a first frequency range of the first color channel and/or a second frequency range of the second color channel are set based on the at least one specific frequency of the one or several LEDs.

* * * * *